US008677186B2

(12) United States Patent
Maybee et al.

(10) Patent No.: US 8,677,186 B2
(45) Date of Patent: Mar. 18, 2014

(54) DEBUGGING IN DATA PARALLEL COMPUTATIONS

(75) Inventors: Paul E. Maybee, Seattle, WA (US); Eric S. Leese, Seattle, WA (US); John Lee Rapp, Redmond, WA (US); Maria K. Blees, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/969,482

(22) Filed: Dec. 15, 2010

(65) Prior Publication Data

US 2012/0159258 A1    Jun. 21, 2012

(51) Int. Cl.
*G06F 11/00*    (2006.01)

(52) U.S. Cl.
USPC .......... 714/38.1; 714/34; 714/38.13; 717/124

(58) Field of Classification Search
USPC ............... 714/25, 32, 33, 34, 35, 38.1, 38.13; 717/124, 129
See application file for complete search history.

(56) References Cited

U.S. PATENT DOCUMENTS

| | | |
|---|---|---|
| 4,493,027 A | 1/1985 | Katz et al. |
| 6,021,275 A | 2/2000 | Horwat |
| 6,071,317 A | 6/2000 | Nagel |
| 6,081,665 A | 6/2000 | Nilsen et al. |
| 6,502,237 B1 | 12/2002 | Yates et al. |
| 6,809,732 B2 | 10/2004 | Zatz |
| 6,988,264 B2 | 1/2006 | Sarma |
| 7,111,290 B1 | 9/2006 | Yates et al. |
| 7,600,155 B1 | 10/2009 | Nickolls et al. |
| 7,836,430 B2 | 11/2010 | Shebs |
| 7,950,001 B2 | 5/2011 | Panchamukhi et al. |
| 7,975,260 B1 | 7/2011 | Conover |
| 8,146,061 B2 * | 3/2012 | Xu et al. ........................ 717/135 |
| 8,166,450 B2 | 4/2012 | Fuhler et al. |
| 8,261,242 B2 | 9/2012 | Booth et al. |
| 8,341,604 B2 | 12/2012 | Codrescu et al. |
| 8,429,617 B2 * | 4/2013 | Demetriou et al. ........... 717/124 |
| 8,468,500 B2 | 6/2013 | Hatabu |
| 2003/0145282 A1 | 7/2003 | Thomas et al. |
| 2003/0145310 A1 | 7/2003 | Thames et al. |
| 2003/0163801 A1 | 8/2003 | Thames et al. |

(Continued)

FOREIGN PATENT DOCUMENTS

| | | |
|---|---|---|
| CN | 1266513 A | 9/2000 |
| WO | WO 2008002350 A1 | 1/2008 |

OTHER PUBLICATIONS

Debug a Vertex Shader, Oct. 11, 2010 (Retrieved Date), (6 pages).

(Continued)

*Primary Examiner* — Joseph D Manoskey
(74) *Attorney, Agent, or Firm* — Workman Nydegger (57) ABSTRACT

The debugging of a program in a data parallel environment. A connection is established between a debugging module and a process of the data parallel environment. The connection causes the data parallel environment to notify the debugging module of certain events as they occur in the execution of the process. Upon notification of such an event, the process execution is paused, and the debugging module may query the data parallel environment for information regarding the process at the device independent virtual machine layer. Upon completion of this querying, the process may then resume execution. This may occur repeatedly if multiple events are encountered.

20 Claims, 4 Drawing Sheets

(56) References Cited

U.S. PATENT DOCUMENTS

| | | |
|---|---|---|
| 2004/0111707 A1 | 6/2004 | Bliss |
| 2004/0205747 A1* | 10/2004 | Bernstein et al. ............. 717/174 |
| 2004/0268331 A1 | 12/2004 | Mitchell et al. |
| 2005/0066308 A1 | 3/2005 | Han |
| 2005/0097399 A1 | 5/2005 | Bliss et al. |
| 2006/0048098 A1* | 3/2006 | Gatlin et al. ................. 717/124 |
| 2006/0069953 A1* | 3/2006 | Lippett et al. .................. 714/25 |
| 2006/0082577 A1 | 4/2006 | Carter |
| 2006/0107250 A1 | 5/2006 | Tarditi |
| 2007/0018980 A1 | 1/2007 | Berteig et al. |
| 2007/0250820 A1 | 10/2007 | Edwards et al. |
| 2007/0271553 A1 | 11/2007 | Higgins et al. |
| 2009/0006895 A1 | 1/2009 | May et al. |
| 2009/0282390 A1 | 11/2009 | Geselowitz |
| 2009/0307667 A1 | 12/2009 | Booth et al. |
| 2009/0322751 A1 | 12/2009 | Oneppo |
| 2010/0131934 A1 | 5/2010 | Kim et al. |
| 2010/0149185 A1 | 6/2010 | Caperwell et al. |
| 2011/0072309 A1* | 3/2011 | Sakai et al. ..................... 714/35 |
| 2011/0214109 A1 | 9/2011 | Pedersen |
| 2012/0167062 A1 | 6/2012 | Levanoni |
| 2012/0317394 A1 | 12/2012 | Zhu |
| 2013/0007712 A1 | 1/2013 | Agarwal et al. |

OTHER PUBLICATIONS

DirectX Software Development Kit, Oct. 11, 2010 (Retrieved Date), (4 pages).
D3DXSHADER Flags, Sep. 14, 2010, (4 pages).
Greg Watson, "ptp design document", Nov. 10, 2007, (12 pages).
Gregory Pakosz, "How to debug DirectX 11 Compute Shaders?", Dec. 19, 2009, (1 page).
PIX, Oct. 11, 2010 (Retrieved Date), (2 pages).
NVIDIA Parallel Nsight, Sep. 22, 2010, (2 pages).
Appendix B: Debugging and Profiling Parallel Applications, Pub. Date: 2010, (9 pages).
NVIDIA Compute, "PTX: Parallel Thread Execution" ISA Version 1.1, Oct. 24, 2007, 93 pages.
Bleisweiss, Avi, "Shading Compilers", Based on information and belief available, at least as early as Jan. 3, 2011, 22 pages.
Lejdfors, Calle, et al., "PyFX: A Framework for Programming Real-Time Effects", at least as early as Jan. 3, 2011, 12 pages.
Opensourceproject.ogr.cn, "Debugging Multiple Tasks", 2007, 5 pages.
Banks, "C Support for Multiple Address Spaces in Embedded Systems", May 31, 2001, 5 pages.
Unix International, "DWARF Debugging Information Format", Jul. 27, 1993, 108 pages.
Watson, Greg, et al., "Relative Debugging for Data-Parallel Programs: A ZPL Case Study", Oct. 2000 IEEE, pp. 42-52.
George C. Necula et al., "CIL: Intermediate Language and Tools for Analysis and Transformations for C Programs", 2002 [Retrieved on Feb. 27, 2013] retriefed from the internet: <URL: http://download.springer.com/static/pdf/21/chp%253A10.1007%252F3-540-45937-5_16.pdf?auth66=1363282191_a5b9292a8db54ed128fc73f27ab0ad1b&ext=.pdf> 16 pages.
Notice of Allowance dated May 15, 2013 cited in U.S. Appl. No. 13/158,077.
Venkataramani et al., "MemTracker: An Accelerator for Memory Debugging and Monitoring", Jun. 2009, 33 pages.
Orso et al., "Classifying Data Dependences in the Presence of Pointers for Program Comprehension, Testing, and Debugging", Apr. 2004, 41 pages.
Notice of Allowance dated Nov. 1, 2013 U.S. Appl. No. 13/172,521.

* cited by examiner

DEBUGGING IN DATA PARALLEL COMPUTATIONS

BACKGROUND

In parallel computing environments, multiple processors are used to execute parallel processes. Data parallel computation involves the assignment of portions of a data set as input to each of multiple parallel processes so that each data portion may be processed in parallel. Often, data parallel computation is offloaded to specialized hardware or devices such as, for example, a General-Purpose Graphics Processing Unit (GPGPU).

One way this offloading may occur is via the use of DirectX's Application Program Interface, specifically the DirectCompute method. The user authors a program using a higher level language. The program is then compiled into a program often called a data parallel kernel or "shader". The kernel is then loaded onto the device for execution using DirectX Application Program Interfaces (APIs).

BRIEF SUMMARY

At least one embodiment described herein relates to the debugging of a program in a data parallel environment. A connection is established between a debugging module and a process of the data parallel environment. The connection causes the data parallel environment to notify the debugging module of certain events as they occur in the execution of the process. Upon notification of such an event, the process execution is paused, and the debugging module may query the data parallel environment for information regarding the process at the device-independent virtual machine layer. Upon completion of this querying, the process may then resume execution. This may occur repeatedly if multiple events are encountered. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the debugging of a program in a data parallel environment is described. A connection is established between a debugging module and a process of the data parallel environment. The connection causes the data parallel environment to notify the debugging module of certain events as they occur in the execution of the process. Upon notification of such an event, the process execution is paused, and the debugging module may query the data parallel environment for information regarding the process at the device-independent virtual machine level. Upon completion of this querying, the process may then resume execution. This may occur repeatedly if multiple events are encountered. First, some introductory discussion regarding computing systems will be described with respect to FIG. 1. Then, the embodiments of the debugging will be described with respect to FIGS. 2 through 4.

Figure 1:
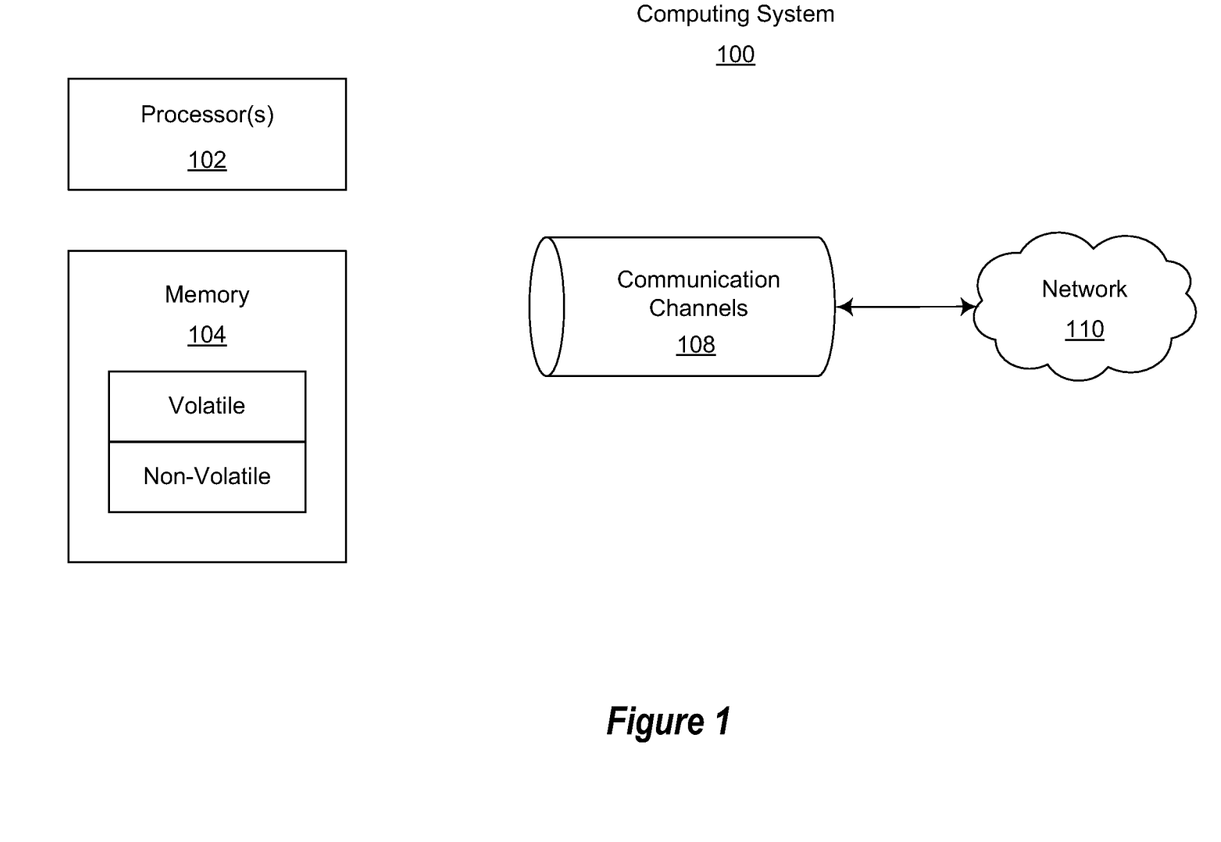
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
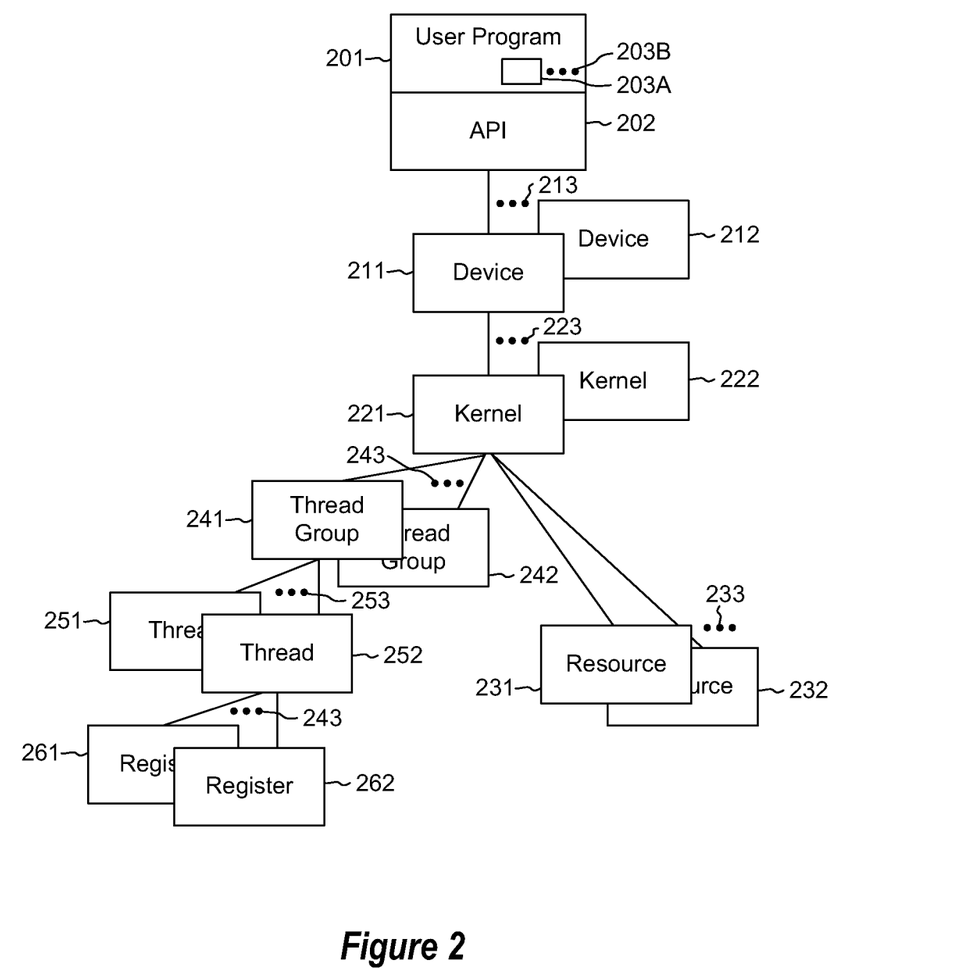
FIG. 2 illustrates a data parallel environment in which data parallel computing may occur.

FIG. 2 illustrates a data parallel environment in which data parallel computing may occur. Data parallel computation involves the assignment of portions of a data set as input to each of multiple parallel processes so that each data portion may be processed in parallel. The data parallel environment is created to assist a user program 201 in its computation. Specifically, the user program 201 includes a code portion 203A that is to be executed by the data parallel environment. The ellipses 203B represents that there may be more than a single code portion of the user program 201 that is to be executed by the data parallel environment.

That data parallel environment may include at least one assisting data parallel processing device. In the illustrated embodiment, and for illustrative purposes only, the data parallel environment is illustrated as including two devices 211 and 212 that assist in the data parallel computations of the user program. However, the ellipses 213 represents that there may be other numbers of devices as well, perhaps as few as one, and perhaps being a very large number of devices.

The user program 201 has access to an application program interface (API) 202 that may be used by the user program 201 for the purposes of creating this data parallel environment that is to assist in the computations of the user program. For instance, at first, there are no data parallel computing devices yet in the data parallel environment. When the first or any subsequent device is to be added to the data parallel environment, the user program 201 calls one or more methods of the API 202 to register the device as being available. In one embodiment, the API is the DirectX or D3D API and the devices 211, 212 are General-Purpose Graphics Processing Units (commonly referred to as GPGPUs).

The functionality attributable to the code 203A is then assigned to the device. For instance, the code 203A may be provided to a compiler (not shown) that converts the code 203A into a device-independent binary form (hereinafter, the "device independent code"). The device-independent code operates at the virtual machine layer in that it is independent of the actual physical hardware of the device on which the functionality of the code is to be performed. The device-independent code has information regarding the programming model of the code 203A including the concept of kernels (i.e., offloaded code), thread groups, registers, resources, and the like. The user program 201 may use the API 202 to further provide the device-independent binary form of the code to a device driver.

A device driver associated with the target device then converts, if necessary, the device-independent binary into binary that is suitable for the instruction set recognized by the target device. The device-specific binary (hereinafter, referred to as a "kernel") is then loaded into the device. FIG. 2 illustrates that there are two kernels 221 and 222 associated with the device 211, representing that this may be repeated multiple times to load multiple segments of binary into each of the devices. The ellipses 223 represent that there may be but a single kernel loaded into each device, and/or perhaps a larger number of kernels loaded into each device.

The user program 201 may then use the API 202 to provide a set of resources to the kernel. For instance, the input resources may be input data, allocated structures for output data, memory resources, or the like. In FIG. 2, the resources 231 and 232 are shown as being associated with the kernel 221, although the ellipses 233 represents that there is no limit to the number of resources that may be made available to the kernel 221.

The device 211 (and potentially the other devices 212 and 213) have the ability to execute multiple threads of operation simultaneously. Some devices even have the capability of executing thousands of threads. The principles described herein permit an application program interface for debugging such complex data parallel environments as will be described hereinafter. In the illustrated programming model, threads are organized into thread groups. For instance, kernel 221 is executed using at least one thread group 241, and potentially others as represented by the thread group 242 and the ellipses 243. The thread group 241 includes at least one thread 251, and potentially others as represented by the thread 252 and the ellipses 253. In this programming model, each thread is associated with one or more registers. For instance, the thread 252 is associated with at least register 261, as well as potentially other registers as represented by the register 262 and the ellipses 263.

Figure 3:
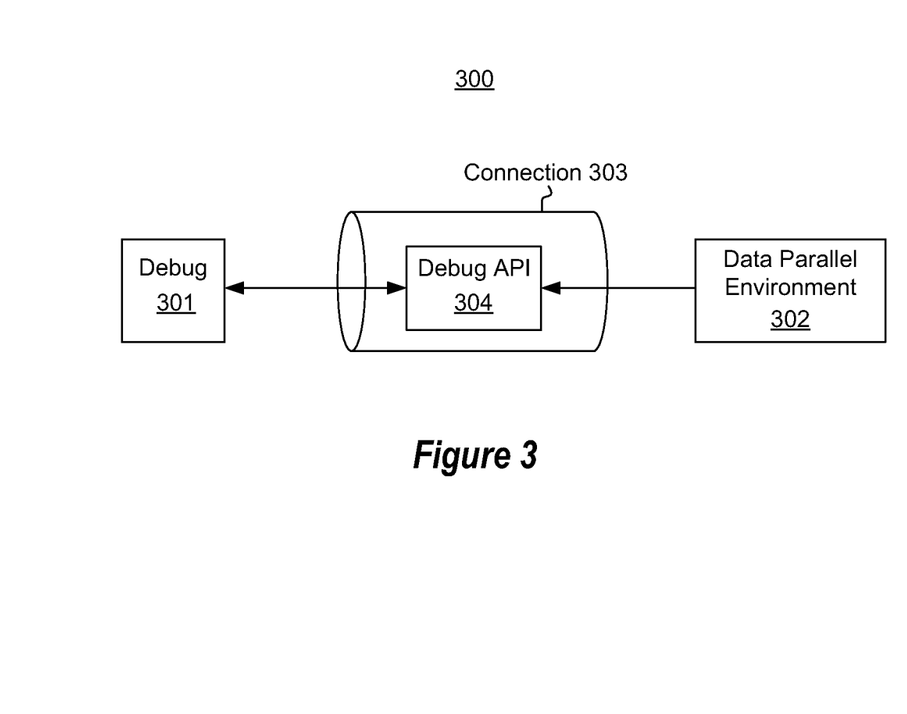
FIG. 3 illustrates an environment that includes a debugging module having a connection with a data parallel environment.
Figure 4:
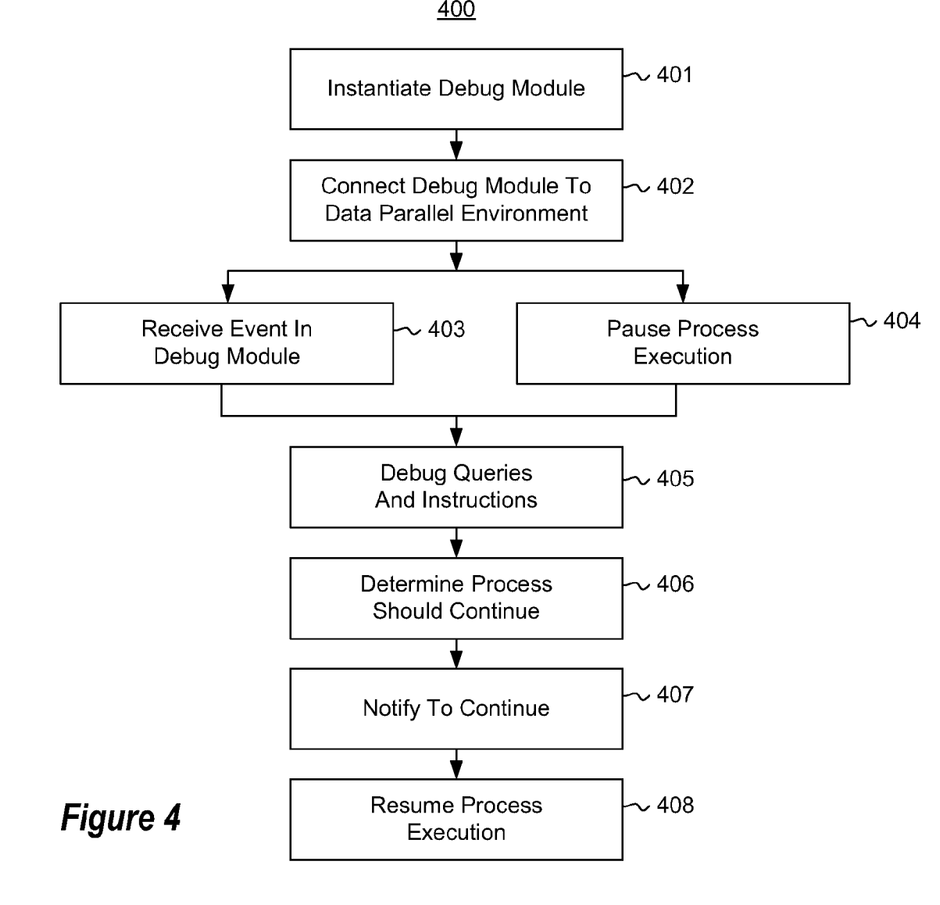
FIG. 4 illustrates a flowchart of a method for debugging a data parallel environment.

FIG. 3 illustrates an environment 300 that includes a debugging module 301 having a connection 303 with a data parallel environment 302. The data parallel environment of FIG. 2 is an example of the data parallel environment 302 of FIG. 3. FIG. 4 illustrates a flowchart of a method 400 for debugging a data parallel environment, and will now be described with frequent reference to the environments of FIGS. 2 and 3.

The method 400 is initiated upon instantiating the debugging module (act 401). For instance, referring to FIG. 3, the debug module 301 may be instantiated. The debug module is used for debugging a kernel or process in a data parallel environment. For instance, referring to FIG. 3, the debug module 301 may be used to debug the data parallel environment 302.

Next, a connection is established between the debugging module and a kernel or process in the data parallel environment 302 (act 402). In FIG. 3, for example, the connection is represented by element 303. The connection permits a debug API 304 to be used in communication between the debug module 301 and the data parallel environment 302. In one example of the debug API 304, the connection 303 may be established by calling a method that provides an identifier for the process to connect to, as well as any potential configuration parameters. The method returns with a process handle to be used in subsequent calls to that process. After the debugging of the process is completed, another method may be called that may use that process handle to detach the debugger from the process.

The connection established between the debug module and the process in the data parallel process is sufficient that, when one of a set of events occurs corresponding to the process, the debug module is notified of the event, the process pauses execution, and the data parallel environment becomes responsive to queries and instructions made by the debug module 301 through the debug API 304. Thus, once the connection is made, the debug module waits for an event from the program corresponding to the process. Returning to FIG. 4, the debug module detects an event (act 403) corresponding to a state of the process from a data parallel environment.

The set of events might include any event that would be relevant to debugging. For instance, a new device has been added to the data parallel environment, a change in state of the kernel associated with the process. For instance, the events might include that the kernel has been loaded into the device, the kernel has begun execution, the kernel has stopped ceased execution without completing, the kernel has reported a warning, the kernel has emitted a trace event, or the kernel has completed execution. Another event might be that a breakpoint has been encountered in the execution.

In addition to the debug module being notified of the event, the process pauses (act 404), and awaits instructions from the debug module to continue. For instance, there may be a method of the debug API 304 that may be called that informs the process that the debug module 301 is to be notified of events, although in the alternative, the method to connect to the process may be taken as an implicit request to be notified of events. In the expressed case, perhaps there is a timeout associated with the request to be notified of events.

In the meantime, while the process is paused, the associated data parallel environment may respond to queries and instructions made by the debug module through the debug API 304 (act 405). Examples of such debug queries and instructions will be enumerated further below, upon completion of the description of FIG. 4.

Rather than debug directly with the device-specific kernels, the debugging module 301 interfaces through the debug API 304 with the device-independent code at the virtual machine layer. Since the device-independent code is the same, regardless of the specific hardware used, this allows the debug API 304 to also be independent of the specific hardware and devices used to support the data parallel environment. Thus, there need not be one debug API 304 for one set of hardware, and another debug API 304 for another set of hardware. Rather, the debug API 304 may be flexibly applied to the data parallel environment regardless of the supporting hardware.

At some point, perhaps after all of the queries and instructions have been completed at that particular point in execution of the process, the debug module determines that the process should continue execution (act 406). In response, the debug module causes execution of the process to resume. For instance, the debug module may notify the data parallel environment of the need to continue (act 407) through the debug API. That may be performed by calling a method of the debug API along with the process handle. In response thereto, the process continuing execution (act 408) until perhaps the next event. If the event were, on the other hand, the completion of the process, then there would be no instructions to resume execution of the process. In one embodiment, a method may be called to force the execution of the data parallel environment to cease so that the data parallel environment may be queried.

The debug API 304 may include a number of methods to gather information regarding a state of the process associated with the connection. This includes the following example methods:

1) A method that may be called to return kernel handles for all executing kernels on a device;
2) A method that may be called to return static program information for a particular kernel associated with a process;
3) A method that obtains thread dimensions and register types corresponding to a process;
4) A method to get register information associated with a process and kernel;
5) A method to get information about a device;
6) A method to get content of a memory used by the process;
7) A method to write information to the memory for a process;
8) A method to clear memory for a process;
9) A method to access a resource layout to layer interpret the content of the memory;
10) A method to determine which thread groups of the process include at least one thread that is executing;
11) A method to determine which threads of a thread group are executing;
12) A method that provides access to register content;

13) A method that reads registers for all threads in a thread group;
14) A method that provides access to structured and raw shared registers;
15) A method that obtains the state of the thread groups including inactive thread groups;
16) A method that shows the order in which the threads are scheduled to execute;
17) A method to obtain multiple register or memory values for many or all threads; and
18) Any other method that may be used to access helpful debugging information.

Furthermore, the debug API may include methods that permits the debug application to manipulate breakpoints including the following:
1) A method to set or insert a breakpoint;
2) A method that obtaining information regarding one or more breakpoints;
3) A method that deletes one or more breakpoints;
4) A method that disables one or more breakpoints;
5) A method that enables one or more breakpoints; and
6) A method that enumerates all breakpoints.

The breakpoints may be conditional breakpoint that are active only if a certain condition is met or set of conditions are met and/or a per thread breakpoint that is applicable to only a subset of the threads. The breakpoint may be activated if a particular memory is accessed or if a register is accessed. A breakpoint may also be a single step breakpoint that moves forward one step each time the execution of the process resumes. The single step breakpoint might not persist through the entire execution, but may perhaps be enabled at each step by the debugger or its user.

The debug API thus provides a high level of fine-grained control over the debug process in a data parallel environment in which many threads may be executing. For instance, the state of execution down to a single thread may be closely examined. Furthermore, thread-specific breakpoints may be inserted and manipulated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for debugging a data parallel environment, the method comprising:
    an act of instantiating a debugging module in a data parallel environment that includes at least one device, wherein the data parallel environment is running at least one process; and
    an act of establishing a connection between the debugging module and a process of the data parallel environment, the connection established through a debug application program interface (API) to a device independent virtual machine layer, such that when one of a set of events occurs corresponding to the process,
    1) the data parallel environment notifies the debugging module of the event,
    2) the process pauses execution, and
    3) the data parallel environment becomes responsive to queries from the debugging module regarding the process at the device independent virtual machine layer through the API.

2. The method in accordance with claim 1, further comprising:
    an act of the debugging module determining that the process should continue execution;
    an act of the debugging module notifying the data parallel environment, through the application program interface, that the process should continue execution; and
    an act of the process continuing execution responsive to the notification from the debugging module that the process should continue execution.

3. The method in accordance with claim 1, wherein the application program interface comprises:
    at least one method that permits the debugging module to obtain information regarding a state of the process.

4. The method in accordance with claim 3, wherein the application program interface comprises:
    at least one method that permits the debugging module to obtain information regarding or a state of a register set of a program in paused execution in the data parallel environment.

5. The method in accordance with claim 3, wherein the application program interface comprises:
    at least one method that permits the debugging module to obtain information regarding or a state of a memory resource of a program in paused execution in the data parallel environment.

6. The method in accordance with claim 3, wherein the application program interface comprises:
    at least one method that permits the debugging module to obtain information corresponding to one or more threads of a program in paused execution in the data parallel environment.

7. The method in accordance with claim 1, wherein the application program interface comprises:
    at least one method that permits the debug application to insert one or more breakpoints into a program running in the data parallel environment.

8. The method in accordance with claim 7, wherein the application program interface comprises:
    at least one method that permits the debug application to delete one or more breakpoints into a program running in the data parallel environment.

9. The method in accordance with claim 7, wherein the application program interface comprises:
    at least one method that permits the debug application to obtaining information regarding one or more breakpoints into a program running in the data parallel environment.

10. The method in accordance with claim 7, wherein the one or more breakpoints comprises a conditional breakpoint.

11. The method in accordance with claim 7, wherein the one or more breakpoints comprises a per-thread breakpoint.

12. The method in accordance with claim 7, wherein the one or more breakpoints comprises a memory access breakpoint.

13. The method in accordance with claim 1, wherein the application program interface comprises:
    at least one method to obtain multiple register or memory values for multiple threads.

14. A computer program product comprising one or more computer storage media having thereon computer executable instructions, that when executed by one or more processors of a computing system, cause the computing system to perform the following:
    an act of instantiating a debugging module; and
    an act of establishing a connection between the debugging module and a process of a data parallel environment, the connection established through a debug application program interface (API) to a device independent virtual machine layer, such that when one of a set of events occurs corresponding to the process,
1) the data parallel environment notifies the debugging module of the event,
2) the process pauses execution, and
3) the data parallel environment becomes responsive to queries from the debugging module regarding the process at the device independent virtual machine layer through the API.

15. The computer program product in accordance with claim 14, wherein the computer-executable instructions are further structured such that, when executed by the one or more processors, the debugging module determines that the process should continue execution, and in response, the debugging module notifies the data parallel environment through an application program interface that the process should continue execution.

16. The computer program product in accordance with claim 15, wherein the application program interface comprises:
at least one method that permits the debugging module to obtain information regarding a state of the process.

17. The computer program product in accordance with claim 16, wherein the application program interface comprises:
at least one method that permits the debugging module to obtain information regarding or a state of a register set of a program in paused execution in the data parallel environment.

18. The computer program product in accordance with claim 16, wherein the application program interface comprises:
at least one method that permits the debugging module to obtain information corresponding to one or more threads of a program in paused execution in the data parallel environment.

19. The computer program product in accordance with claim 15, wherein the application program interface comprises:
at least one method that permits the debug application to insert one or more breakpoints into a program running in the data parallel environment.

20. A method for debugging in a data parallel environment, the method comprising:
an act of establishing a connection between a debugging module and a process of a data parallel environment, the connection established through a debug application program interface (API) to a device independent virtual machine layer;
an act of the debugging module detecting an event corresponding to a state of the process from the data parallel environment;
an act of pausing execution of the process in response to the event;
while the execution of the process is paused, an act of the debugging module querying the data parallel environment at the device independent virtual machine layer regarding the state of the process under paused execution; and
an act of the debugging module causing execution of the process to resume after the debugging module querying the data parallel environment.

* * * * *